Feb. 11, 1964    G. SORSKY ET AL    3,121,137
MEANS FOR RUPTURING A THERMOCOUPLE CABLE
AT A PREDETERMINED LOAD
Filed April 13, 1961    2 Sheets-Sheet 2
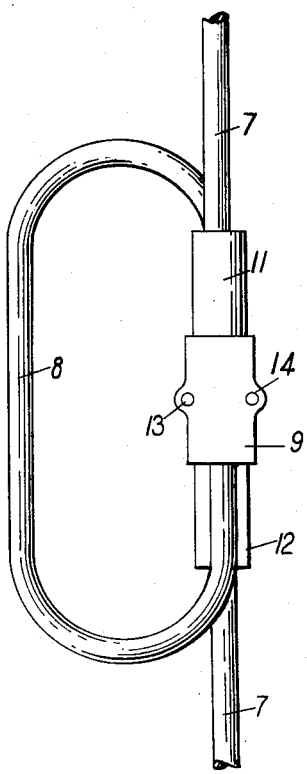
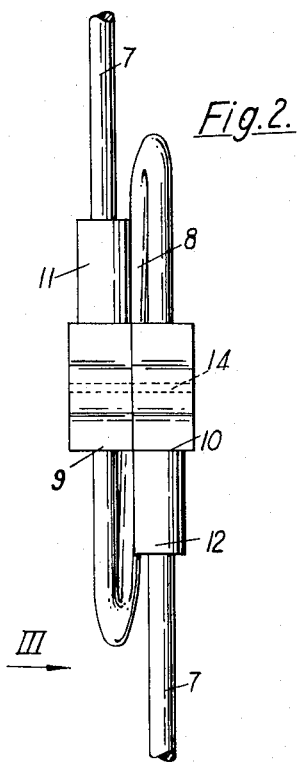
Inventors
Gideon Sorsky
F. A. Ainsworth
By
Abel Mackey + Burden
Attorney United States Patent Office 3,121,137
Patented Feb. 11, 1964

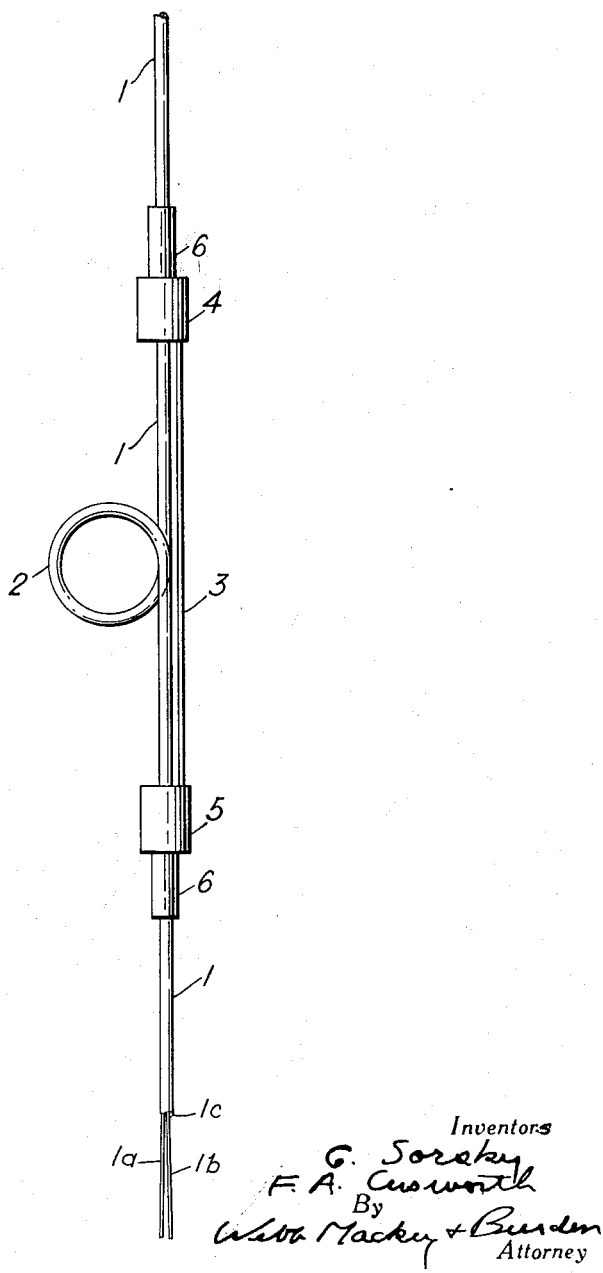

3,121,137
MEANS FOR RUPTURING A THERMOCOUPLE CABLE AT A PREDETERMINED LOAD
Gideon Sorsky, Liverpool, and Frederick Alan Cusworth, Woolton, Liverpool, England, assignors to British Insulated Callender's Cables Limited, London, England, a British company
Filed Apr. 13, 1961, Ser. No. 102,732
8 Claims. (Cl. 174—70)

This invention relates to thermocouple cables comprising a pair of mutually insulated conductors of dissimilar metals which when connected together at one end constitute a thermocouple junction. More particularly it relates to mineral insulated thermocouple cables which either comprise one or more than one pair of conductors of dissimilar metals insulated from one another and from other pairs if any and from an enclosing metal sheath by highly compacted powder mineral insulation, usually magnesium oxide, or comprise a single metal conductor insulated from an enclosing metal sheath of a dissimilar metal by such insulation.

For some purposes it is desirable that such cable (hereinafter referred to as thermocouple cable) shall be rendered capable of being ruptured at a predetermined point in its length by a tensile load equal to or closely approximating a given tensile load that is less than the normal breaking load of the cable, and it is the object of this invention to provide such a cable.

In accordance with our invention a thermocouple cable rendered capable of being ruptured at a given point in its length by an accurately predetermined tensile load of a magnitude less than the normal breaking load of the cable has at an appropriate point in its length (the point of intended rupture) a loop secured, by means comprising anchorages attached to the parts of the cable approaching the loop and coupling means, linking the anchorages together, designed to break when subjected to the predetermined load, in such a way that upon such breakage of the coupling means the loop of cable will be subjected to said load and will be locally weakened to the extent that it will break under the load. The loop preferably consists of at least one complete turn of the cable whereby the cable is kinked and broken by said load. The loop is preferably secured by a wire that extends alongside the loop between anchorages attached to the cable at points lying one to each side of the loop, the wire having a breaking load equal to the accurately predetermined tensile load at which the cable is intended to be ruptured. On applying the predetermined tensile load the wire will break, the loop will reduce in diameter until a kink is formed, and the cable will then break at the kink under the predetermined load or under a reduced load.

It is preferred to form in the cable a single turn loop having an internal diameter of about four times the diameter of the cable. For securing the loop the looped portion of the cable may be bridged by a stainless steel wire of diameter such that its breaking load is equal to the load at which it is desired to ensure that the cable shall rupture at the given locality. The ends of the wire may be attached to the thermocouple cable in an appropriate manner. They may, for example, be secured by inserting each end in one of two ferrules threaded on the cable and thereafter crimping or compression jointing the ferrules on to the cable, one on each end of the looped portion.

Alternatively, instead of using a wire, the ferrules may be located at the point where two parts of the cable approach or cross to form the loop and secured together by a shear pin or pins, designed to shear when the predetermined load is applied.

Thermocouple cable formed at a point of intended rupture with a secured loop, in accordance with the invention, will hereinafter be described by way of example with reference to the accompanying drawing in which FIGURE 1 is a side elevation of the looped part of a cable, and FIGURES 2 and 3 are end and side elevations of the looped part of another cable.

Referring to FIGURE 1, a cable 1 comprises two conductors 1a and 1b one of nickel-chrome alloy and the other of nickel-aluminium alloy each of 0.012 in. diameter and an enclosing stainless steel sheath 1c of 0.06 in. external diameter and wall thickness 0.006 in. The cable is formed with a loop 2 of internal diameter 0.25 in.

The loop 2 is secured by bridging it with a 2 inch length of stainless steel wire 3 of 0.024 in. diameter attached at its ends to the cable by ferrules 4 and 5. The ferrules are each attached to the cable by compression jointing an integral neck 6 of reduced diameter on to the cable sheath. The ends of the wire 3 are welded into holes in the ferrules.

The breaking loads of the wire 3 and the cable 1 at ambient temperature are 50 lbs. and 100 lbs. respectively.

Referring to FIGURE 2 a cable 7 similar to that shown in FIGURE 1 is formed with a loop 8 secured by means for ferrules 9 and 10. The ferrules 9 and 10 are crimped onto the cable 7 at 11 and 12 and attached together by a pair of shear pins 13 and 14.

The breaking loads of the cable 7 and of the pair of shear pins 13 and 14 at ambient temperature are 100 lbs. and 50 lbs. respectively.

Our improved locally rupturable thermocouple cable is especially valuable for use in connection with fuel cans in a nuclear reactor where it is necessary to detach the thermocouples connected to the cans during re-loading. Any type of temperature measuring device involving separate lengths of thermocouple leads connected by some mechanical means is certain to result in erroneous temperature readings. By using our improved thermocouple cable, the fuel can may be lowered into its channel by suspending it by the cable but can be separated from the can when the can has to be discharged, simply by applying to the cable a pull equal to that of the breaking load of the means securing the loop, for example the wire bridging the loop—this breaking load naturally being made substantially greater than the weight of the can. If the loop is not secured by a bridging wire or otherwise, the breaking load of the cable at the loop is apt to vary but is generally less than the load due to the weight of the can. Alternatively, when the can is supported by means other than the thermocouple cable, after the can has been released from such other supporting means, the weight of the can can be made to break the securing means and rupture the cable.

What we claim as our invention is:
1. A thermocouple cable formed at a point of intended rupture with a loop of at least one turn and provided with means for securing the loop comprising anchorages secured to the parts of the cable approaching the loop and coupling means, linking the anchorages together, designed to break when subjected to a predetermined load less than the breaking load of the cable, the dimensions of the loop being such that upon breakage of said coupling means under said load the loop of the cable will be subjected to said load and will kink and break.

2. A cable as claimed in claim 1 in which the loop is a single turn loop having an internal diameter of about four times the diameter of the cable.

3. A thermocouple cable formed at a point of intended rupture with a loop of at least one turn and provided with means for securing the loop comprising anchorages secured to the cable one on each side of the loop and a wire, designed to break when subjected to a predetermined load less than the breaking load of the cable, extending alongside the loop and linking the anchorages together, the dimensions of the loop being such that upon breakage of said wire under said load the loop of the cable will be subjected to said load and will kink and break.

4. A cable as claimed in claim 3 in which the anchorages comprise ferrules crimped or compression jointed on to the cable.

5. A cable as claimed in claim 3 in which the breaking load of the wire is approximately half that of the cable.

6. A thermocouple cable formed at a point of intended rupture with a loop of at least one turn and provided with means for securing the loop comprising anchorages lying side by side and secured to the parts of the cable approaching the loop and at least one shear pin, coupling the anchorages together, designed to break when subjected to a predetermined load less than the breaking load of the cable, the dimensions of the loop being such that upon breakage of said shear pin under said load the loop of the cable will be subjected to said load and will kink and break.

7. A cable as claimed in claim 6 in which the anchorages comprise ferrules crimped or compression jointed on to the cable.

8. A cable as claimed in claim 6 in which the breaking load of the shear pin is approximately half that of the cable.

References Cited in the file of this patent

UNITED STATES PATENTS

| 1,034,741 | Smith | Aug. 6, 1912 |
| 1,517,602 | Trogner | Dec. 2, 1924 |

FOREIGN PATENTS

| 17,316 | Sweden | May 2, 1904 |